United States Patent [19]

Roberfroid et al.

[11] Patent Number: 5,721,345
[45] Date of Patent: Feb. 24, 1998

[54] PREVENTION OF MAMMARY CARCINOGENESIS AND BREAST CANCER TREATMENT

[75] Inventors: Marcel Roberfroid; Nathalie Delzenne, both of Brussels; Paul Coussement, Pellenberg; Jan Van Loo, Blanden, all of Belgium

[73] Assignee: Raffinerie Tirlemontoise, S.A., Belgium

[21] Appl. No.: 685,109

[22] Filed: Jul. 23, 1996

Related U.S. Application Data

[63] Continuation of Ser. No. 259,713, Jun. 14, 1994, abandoned.

[51] Int. Cl.$^6$ .................................. C07G 3/00; C07H 1/00
[52] U.S. Cl. .......................... 536/4.1; 536/123.1; 514/23; 514/25; 514/54
[58] Field of Search .................... 536/4.1, 123.1; 514/23, 25, 54

[56] References Cited

U.S. PATENT DOCUMENTS 4,927,811   5/1990   Quarles .................................. 514/23
5,169,671  12/1992   Harada et al. ......................... 426/658

FOREIGN PATENT DOCUMENTS 0280474    8/1988   European Pat. Off. .
3539951    5/1986   Germany .
59-110621  6/1984   Japan .
60-089427  5/1985   Japan .
2172921    7/1990   Japan .
2295462   12/1990   Japan .
8702679    5/1987   WIPO .

OTHER PUBLICATIONS

The Merck Index, 9th ed. No. 4865, 1976.
Cohen et al; "Modulation of N–Nitrosomethylurea–Induced Mammary Tumor Promotion by Dietary Fiber and Fat"; 1993; pp. 496–501; Journal of the National Cancer Institute.
Cooper et al; "The Anti–Melanoma Activity of Inulin in Mice"; 1986;pp.903–908; Molecular Immunology vol. 23, No. 8.
Fishbein et al; "Fructooligosaccharides: A Review"; 1988; pp. 104–107; Vet Hum Toxicol vol. 30, No. 2, Apr.

*Primary Examiner*—John W. Rollins
*Attorney, Agent, or Firm*—Hayes, Soloway, Hennessey, Grossman & Hage, P.C.

[57] ABSTRACT

The invention relates to the use of inulin, oligofructose or their derivatives as functional ingredients in functional food, functional feed, OTC and pharmaceutical composition to prevent mammary carcinogenesis or treat breast cancer.

15 Claims, 6 Drawing Sheets

Column: 2x Aminex HPX-87K+
Eluens: KOH solution at pH 9.5
Detection: Waters R410 differential refractometer HPLC Chromatogram from inulin Column: OV1701 ; 60 m ; i.d. 0.25 mm ;
film thickness 0.1 μm.
Temp.prog.: up to 250°C
Detection: FID Carlo Erba GC with on column injector

PREVENTION OF MAMMARY CARCINOGENESIS AND BREAST CANCER TREATMENT

This is a continuation of application Ser. No. 08/259,713 filed on Jun. 14, 1994, now abandoned.

The present invention relates to the use of the functional ingredients inulin, oligofructose or their derivatives for the manufacture of functional food, functional feed, OTC and pharmaceutical compositions for the prevention of mammary carcinogenesis or treatment of breast cancer. The invention also relates to functional food, functional feed, OTC and pharmaceutical compositions comprising said functional ingredients and to the method of prevention or the method of treatment resulting from the use of these functional ingredients.

In industrialised countries the second cause of death after heart disease is cancer. Particularly lung, breast and colon cancer predominate in those countries.

Cancer is the result of an uncontrolled local proliferation of cells with invasion of adjacent normal structures. Metastasis occurs when the cancer spreads via bloodstream or lymphnodes or within a body cavity.

Most patients are women but male breast cancer occurs with 1% the frequency of female breast cancer. Domestic mammals such as dogs, horses, etc. are equally susceptible to mammary cancer.

Human breast cancer also known as mammary cancer (and interchangeably used in the text herewith) is a disease which can result from several factors such as ionising radiation, diet, familial history or exposure to genetic mutagens. Since the determination of the initiation of the breast carcinogenic process is difficult, it is equally difficult to know the exact agents causing the disease.

Although the exclusion of risk factors is a generally accepted approach to avoid the onset or the appearance of putative tumors after the latency period is ended, it is clearly insufficient.

As ideas on the pathogenesis of the disease and on the impact of different factors such as enumerated herein above are continuously evolving, there is still a need for new but also convenient methods to prevent or treat breast cancer patients.

Moreover, there is an urgent need for malignant breast tumor prevention due to the high medical costs involved once an individual becomes a cancer patient. Above that, any possible preventive habit which could be used to avoid or at least retard the disease should be investigates.

In L. A. Cohen et al., J. Nat. Cancer Inst. 83(7), (1991), p 496 it is described how dietary fiber in a high-fat diet is found to be protective against breast cancer. A supplemental soft white wheat bran exerted an inhibitory effect on the promotional phase of N-methylnitrosourea (MNU) induced breast carcinogenesis in rats when supplemented to a high-fat diet but not when added to a low-fat diet. The researchers speculated that dietary fiber acts by decreasing the digestibility of fat, thus mimicing a low-fat condition.

P. D. Cooper et al., Molecul. Immunol. 23(8), (1986), p 895 describes the activation of the alternative pathway of complement by a specific polymorphic form of dahlia inulin named gamma-inulin. Gamma-inulin is formed by >8000 to 10 000 MW polymers (degree of polymerisation 52 to 65) and is insoluble in diluted suspension at 37° C. It is known that an activator of the alternative pathway of complement can have a potential non-specific anti-tumor effect. As such, intraperitoneally injected gamma-inulin is shown to prolongate the survival of melanoma bearing mice (P. D. Cooper et al., Molecul. Immunol. 23(8), (1986), p 903) but the timing of the treatment is very critical.

The patent application JP 60/89427 describes an inulin extract from the roots of a specific member of the Campanulaceae, *Platycodon grandiflorum* A.DC. used to treat tumor cell bearing mice. *Platycodon grandiflorum* comprises sapogenins, known for their pharmaceutical properties.

SUMMARY OF THE INVENTION

The present applicant has now found that inulin, oligofructose and their derivatives have properties of value as functional ingredients in the prevention of mammary carcinogenesis or treatment of breast cancer, comprised in a functional food or in a pharmaceutical composition. More specifically, these functional ingredients negatively modulate mammary carcinogenesis.

The present applicant has demonstrated that they slow down the kinetics of appearance of breast tumors, that they lower the intensity of malignant breast cancer and the yield of all tumors. Unmistakable indications exist that they also lower the degree of invasiveness and reduce metastasis of malignant breast cancer. It is necessary to verify again if the incidence of breast cancer and the duration of the latency period is influenced by these functional ingredients. Some indications exist as to the degree of malignancy of the appearing breast tumors, which appears to be lowered by the said functional ingredient.

Therefore the present invention allows to manufacture a composition destines for the prevention of mammary carcinogenesis or treatment of breast cancer. The composition can be a functional food, a functional feed, an OTC or a pharmaceutical composition. The functional ingredients inulin, oligofructose or their derivatives are used in the manufacturing thereof. The present invention also allows to prevent mammary carcinogenesis of treat breast cancer by the administration of the said functional ingredient according to the invention to a mammal in an amount sufficient to exert its effect, in particular by negatively modulating carcinogenesis.

DESCRIPTION OF THE PREFERRED EMBODIMENTS

Figure 1:
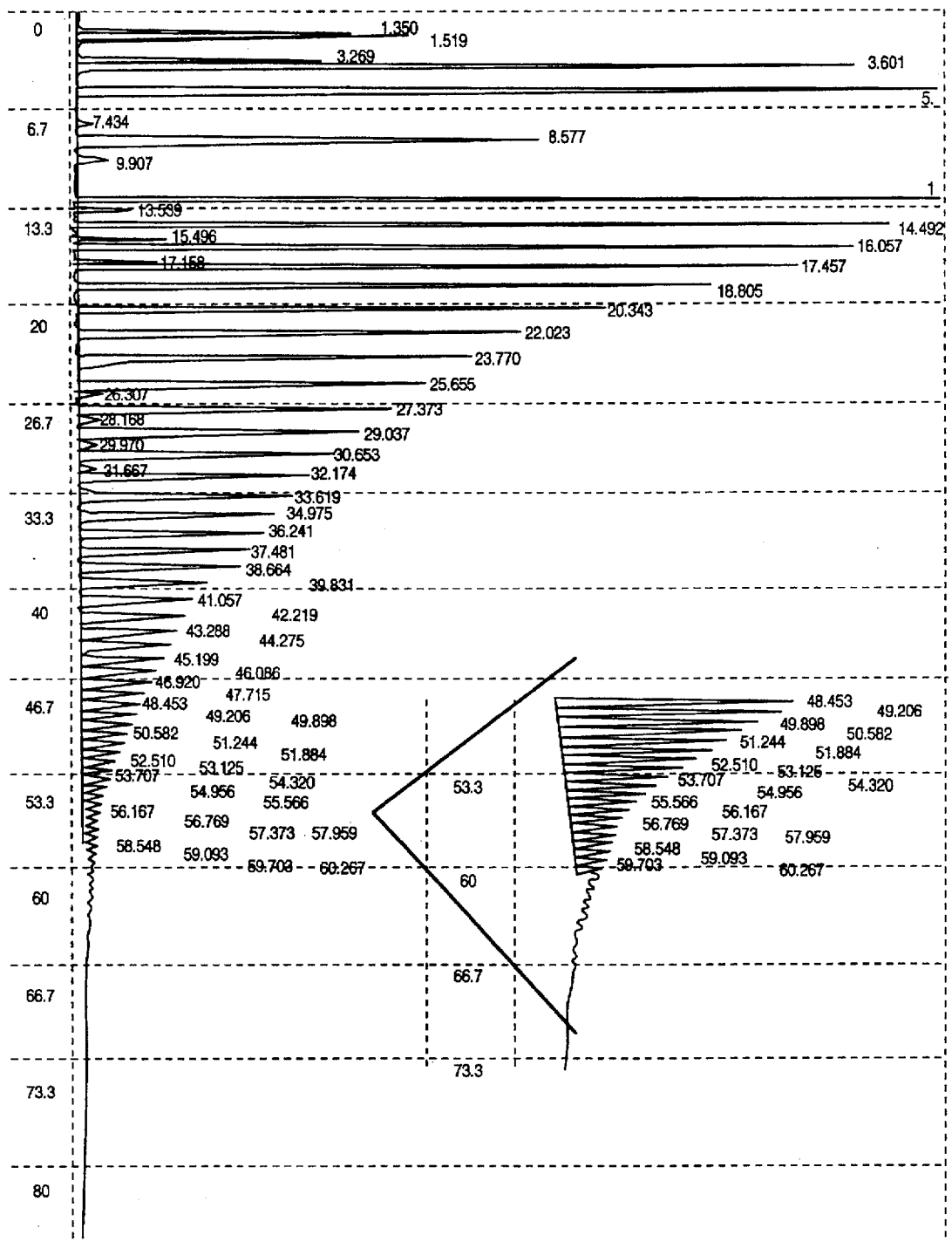
FIG. 1 illustrates a typical HPAEC chromatogram for native chicory inulin.

Negative modulation of breast carcinogenesis is defined as any prevention of mammary carcinogenesis that has at least one of the following effects:

it allows to lengthen the latency period;

it slows down the kinetics of appearance of malignant breast tumors;

it lowers the incidence of breast cancer;

it lowers the intensity of breast cancer;

it lowers the degree of malignancy of appearing breast tumors;

it lowers the degree of invasiveness of malignant breast cancer;

it reduces metastasis of malignant breast cancer.

Incidence of breast cancer is defined as the number of individuals bearing mammary tumors in one test group.

Intensity of breast cancer is the mean number of malignant mammary tumors per individual bearing tumors.

Yield is the total number of, eventually malignant, tumors in one test group.

Tumors can be classified as benign or malign as far as the degree of malignancy is concerned.

Parameters for calculating the reduction of invasiveness and metastasis are expressed as metastasis incidence and incidence of tumors in other organs or tissues.

Modulation of breast carcinogenesis has, as defined herein, no direct relevance to multiphase/multistep carcinogenesis. Its effect can only be demonstrated by following the kinetics of cancers as they appear and/or by recording the incidence and yield of histologically characterised cancers. This terminology should broaden the view on breast carcinogenesis. The negative modulating properties of the functional ingredients according to the invention are particularly interesting in the contest of the effects of more systematic procedures or experimental conditions such as chronic exposure to chemicals, dietary imbalances or surgery that disrupts metabolic or proliferative breast homeostasis. Even though such procedures are not essential for making an otherwise induced process fully carcinogenic, they can still influence its pathogenesis by creating conditions that speed up the kinetics of its development to malignancy and consequently increase or decrease the incidence and/or yield of cancer.

The inulin used according to the invention is a carbohydrate belonging to the group of polysaccharides named fructans. Fructans are compounds in which fructosyl-fructose linkages constitute the majority of the linkages. In inulin most linkages are of the beta-D-(2→1) fructosyl-fructose type. Most but not necessarily all inulin molecules contain a glucose moiety at the non-reducing end of the chain. Glucose is linked as in sucrose by an alpha-1→beta-2 linkage.

It was shown that one of the most suited types of inulin used according to the invention, independent of its origin, is basically a polydispersed mixture of very slightly beta-(2→6) branched beta-(2→1)fructan molecules. As most of the molecules have a terminal glucose unit, this inulin can be presented by the general formula GFn (G=glucose, F=fructose, n varies from 2 up to over 60 with a maximum of 72). The present applicant observed that this inulin comprises a small fraction of molecules with general formula Fm that do not contain any glucose at all. The corresponding general chemical formula is thus as follows:

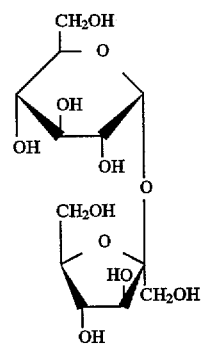

Sucrose

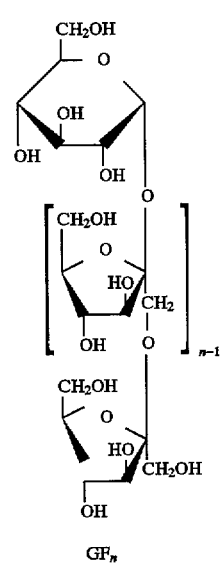

$GF_n$

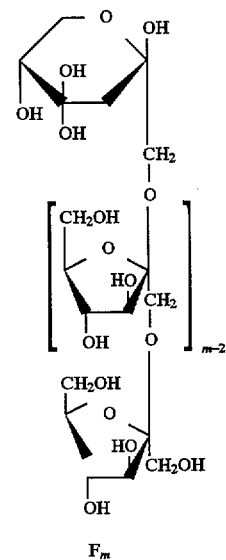

$F_m$

GFn are non reducing molecules, all the fructose units are in the furanose form. Fm molecules are reducing. As suggested by A. D. French, J. Plant Physiol. Vol. 134, (1989), p 125, the reducing fructose residues are predominantly in the pyranose form when dissolved in $D_2O$ and when the beta-D-(2→6)fructofuranosyl is absent. This was confirmed by NMR analysis by the present applicant to be the case for inulin particularly suited to be used according to the invention namely native chicory inulin.

In the contest of the present invention, "native" shall mean inulin or chicory inulin which prior to tis use is extracted from inulin comprising plants with hot water, taking precautions to inhibit plant-own inulinase activity and to avoid acid hydrolysis. The extraction process does not essentially change the molecular structure or the polydispersed composition of inulin. Native inulin can be extracted from J. artichoke, chicory, dahlia etc.

After starch, inulin is one of the most abundant polysaccharide found in nature. As it is present in cereals (e.g. wheat, barley), vegetables (e.g. onion, leek, garlic, asparagus, salsify) and fruit (e.g. bananas), it is naturally present in our diet.

Degree of polymerisation (DP) is defined as the number of monomer units in one molecule. The average degree of polymerisation (average DP) of inulin depends on the plant source and on the moment of harvesting this plant. As such, native dahlia inulin has an average DP of 20 and native chicory inulin of 11. The percentual distribution of the different molecules can be presented as follows:

|  | DP* | | | |
| --- | --- | --- | --- | --- |
|  | 2–9 | 10–20 | 21–40 | >40 |
| chicory | 31 | 24 | 28 | 17 |
| dahlia | 12 | 18 | 21 | 40 |
| J. artichoke | 52 | 22 | 20 | 6 |

*Pranzik, J. Chromato. 348, (1985), p 187

Two inulin crops are very well suited for commercial exploitation, namely, Jerusalem artichoke (*Helianthus tuberosus*) and chicory (*Cichorum intybus*). These plant sources, and the type of inulin they contain, have been studied extensively in the past several decades.

The prefered native inulin of the present invention is chicory inulin. Its average DP varies strikingly in function of the harvesting date. In chicory roots, inulin functions as an osmoregulator increasing cold resistance when broken down. Early in the harvesting season, native chicory inulin has the highest DP. FIG. 1 gives a typical HPAEC chromatogram for native chicory inulin suited for the invention and with an average DP of 11,7 and a maximum DP of 72, obtained with a Carbopac PA1 column, a Dionex 4500i with PAD detection and a 100 mM NaOH/100 to 400 mM NaAc elution gradient. The average DP is determined by the fructose to glucose ratio after complete hydrolysis with SP230 Novozym inulinase at pH 4.5, 30 min at 60° C.

Figure 2:
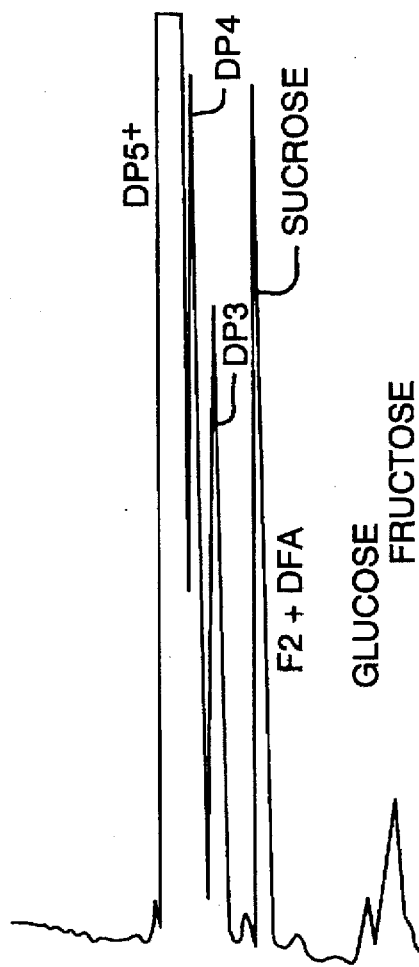
FIG. 2 shows HPLC analysis of inulin fraction.

By means of HPLC analysis (see FIG. 2) it is only possible to differentiate between $DP5^+$ (the integrated sum of DP5 and higher DP molecules), DP4, DP3, saccharose (GF), F2, G, and F. The DP4 and DP3 fractions are coelutions of GFn and Fm compounds.

Figure 3:
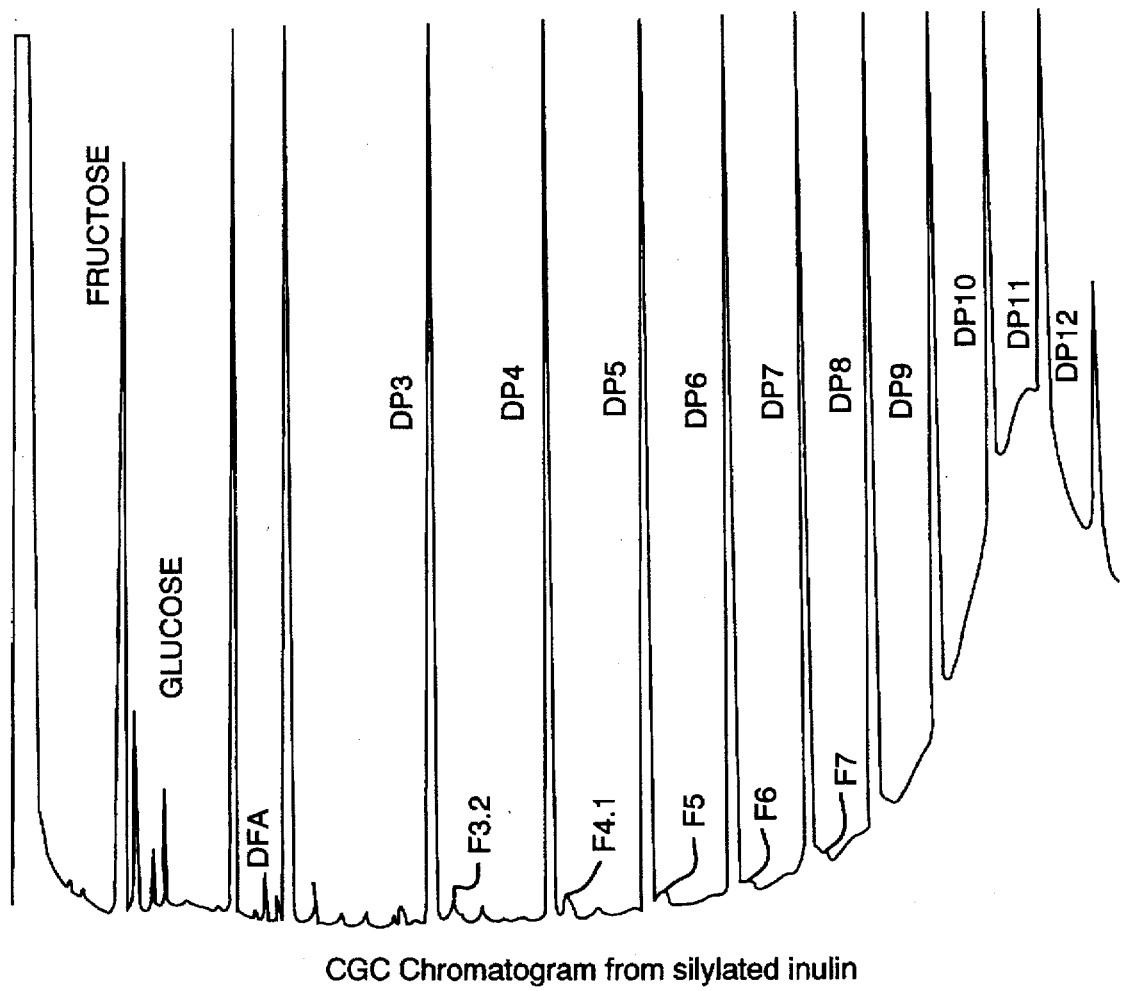
FIG. 3 shows CGC chromatogram from silylated inulin.

CGC, as HPAEC analysis allows to differentiate between GFn and Fm molecules. As shown in FIG. 3, this method allows to determine oligomers with a DP up to 10 due to a temperature programming starting at 105° C. with a 10° C. increase per min, up to 440° C. Helium is used as carrier gas at a constant flow rate of 9 ml/min. The native inulin sample is first dried together with phenyl-beta-D-glucopyranoside as internal standard. After treatment with hydroxylamine, the sugars are derivatised with trimethylsilylimidazole and the volatile derivatives are extracted with isooctane. The determination of the response factor is based upon the analytical results of maltodextrin.

CGC allows to make quantitative analysis of the polydispersed native inulin mixture up to DP 12.

At present, HPAEC is a handsome method to qualitatively characterise inulin but since no standards are available in sufficient quantities, no response factors can be determined and no quantitative measurements could be obtained so far.

Native chicory inulin as particularly preferred in the present invention is a 1 to 2% branched molecule. In the same way 4 to 5% branched inulin molecules were observed in native dahlia inulin. The type of linkage and the occurrence of branching is checked by permethylation as described by S. I. Hakamori, J. Biochem. vol 55, (1964) and followed by reductive cleavage and in situ acetylation. The method is based on procedures described by I. Ciucanu et al., Carboh. Res. Vol. 131(2), (1984), p 209; P. Mischnick et al., Carboh. Res. Vol 185(1), (1989), p 113 and J. G. Jun, Carboh. Res. Vol 163(2), (1987), p 247. This technique allows to differentiate 4-linked aldopyranosyl groups from 5-linked aldofuranosyl compounds as the ring structure of each monosaccharide remains intact. By ionic hydrogenation of all glycoside linkages of the methylated polysaccharide one gets partially methylated anhydro alditols that are acetylated in situ.

Figure 4:
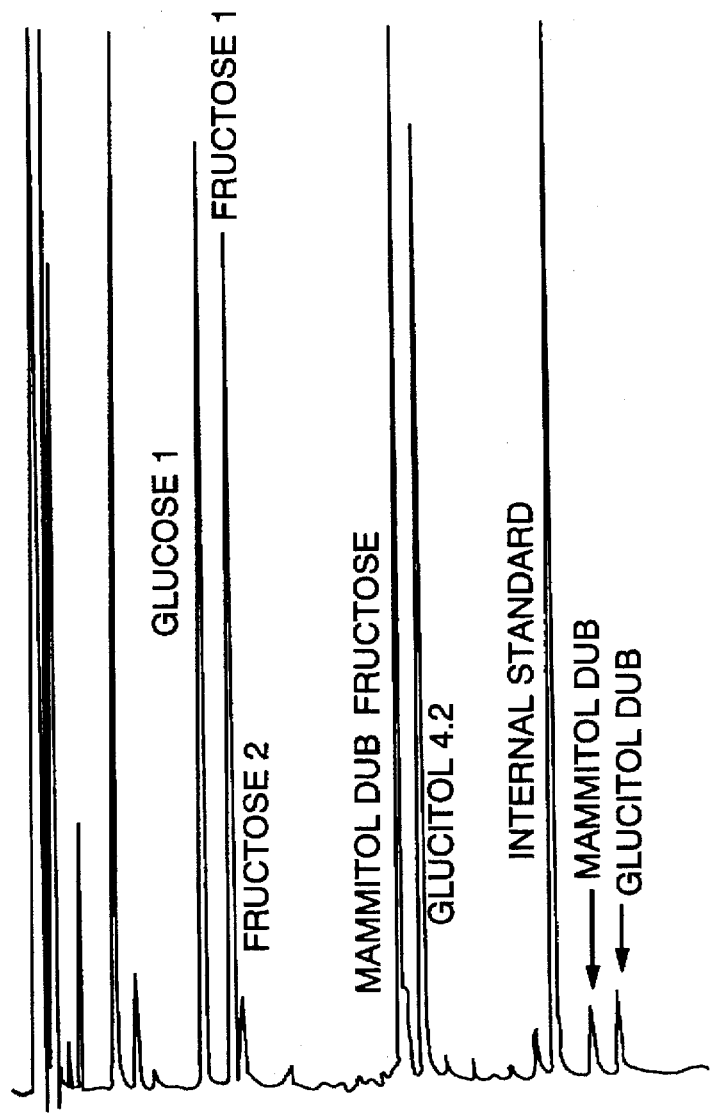
FIG. 4 illustrates a CGC chromatogram of treated native chicory inulin.

FIG. 4 shows a CGC chromatogram of native chicory inulin treated as such.

A commercially available product comprising native chicory inulin and corresponding to particularly prefered type of inulin suited for the present invention, is Raftiline® ST or GR (Raffinerie Tirlemontoise, Belgium). The average DP of Raftiline® ST or GR ranges from 5 to 14, more specifically from 8 to 12, and particularly an average DP between 9 and 11 is prefered. More than 50% of the molecules in Raftiline® ST have a DP between 2 and 20 of which more than half have a DP lower than 10. The dry weight of Raftiline® is on average composed of 92% of native inulin, 2% of monosaccharides (G,F) and 6% of disaccharides (saccharose). Raftiline® is poorly soluble: at high concentrations a temperatures above 85° C. is needed to completely dissolved it. At room temperature an 1% Raftiline solution precipitates and the precipitation accelerates and becomes more complete when the solution is cooled down.

On the other hand, Raftiline® becomes more soluble in hot water but then the pH of the solution becomes an important factor. When the solution is too acidic (pH under 4,5) Raftiline® is partially hydrolysed into his monomers. When the pH is too high (above 6.5) the solution tends to colour. Fibruline® standard (Cosucra, Belgium) is another commercially available native chicory inulin comprising product that can be used according to the invention.

Equally prefered for this invention is a polydispersed inulin essentially free of its mono- and disaccharides. Such a functional ingredient can be obtained according to the process described in PCT/BE93/00072, included herein by reference. Raftiline® LS (Raffinerie Tirlemontoise) is a commercially available product comprising such inulin.

Instant inulin that can be used for this invention, is native inuline dried such that inulin can be added to high dry weight products. The patent application PCT/BE94/00019 describes an instant inulin production method and is included herein by reference. Raftiline® ST gel comprising instant inulin is commercialised by Raffinerie Tirlemontoise, Belgium.

It can be foreseen to use polydispersed inulin whose average DP is modified compared to the native inulin. This can be obtained either by physically separating off the low DP fractions of the polydispersed mixture, by selectively purifying specific DP fractions, by synthesing longer inulin chains etc. Examples of such inulin compositions are inulin I 2255, I 3754, I 2880 respectively comprising modified average DP inulin prepared from native chicory, dahlia and J. artichoke inulin (Sigma, USA) or polyfructans prepared as described in EP 532 775.

Fructooligosaccharides with DP up to 20 are called, by definition, oligofructose. These saccharides are well soluble in water (up to 80% DW solutions are stable). Oligofructose can be composed of a few percentages of FM to roughly equal accounts of Fm or GFn molecules.

Onion comprises mainly native oligofructose from which it can be extracted. Oligofructose can be produced from inulin by partial hydrolysis, enzymatic or acidic.

An oligofructose particularly of interest when used according to the invention can be obtained by partial enzymatic hydrolysis of native inulin from chicory, J. artichoke or dahlia. The DP of the molecules in this polydispersed mainly beta-(2→1)fructan varies between 2 and 8. The average DP ranges from 3 to 6, preferably 3,5 to 5.

The enzymatic hydrolysis can be executed with an endo-inulinase obtained from Aspergillus, Penicillum or Bacillus. An example is described by B. E. Norman, Denpun, Kagaku 36(2), (1989), p 103.

A chicory inulin containing extract is partially purified by means of carbonation and filtration. Filtered clarified juice is evaporated up to a concentration suited for the enzymatic treatment, prior to entering the final purification step. The transformation of inulin into oligofructose is achieved by means of an endo-inulinase which is added to the juice and which performs its hydrolytic action. The resulting product is evaporated in order to prevent microbial development. This crude oligofructose is the feed stock for the final purification process carried out by means of demineralisation ion exchange columns.

A final purification of the oligofructose is achieved by an activates carbon treatment which allows to physically adsorb some minor compounds which would not be eliminated in the preceding purification steps. After removing the activated carbon by means of filtration and a final purification on a mixed bed resin, the thus obtained very pure syrup is filter sterilized, prior to evaporation to a commercially defined concentration.

A particularly preferred oligofructose comprising product useful in the present invention is Raftilose® (Raffinerie Tirlemontoise, Belgium). It is a commercially available product comprising oligofructose obtained by hydrolysing partially purified native chicory inulin using an endo-inulinase.

The different commercially available Raftilose® compositions of Raffinerie Tirlemontoise, Belgium, are on average composed as follows:

| RAFTILOSE | fructose | glucose | sucrose | oligo-fructose |
| --- | --- | --- | --- | --- |
| L30 | 60 | 7.5 | 2.5 | 30 |
| L60 | 12 | | 28 | 60 |
| L85 | 8 | | 7 | 85 |
| L95 | | 5 | | 95 |
| P95 | | 5 | | 95 |

Another method of preparing the functional ingredients according to the present invention is the reaction of fructosyl transferase with sucrose to bound fructose monomers to the sucrose. For example GB 2,105,338 describes such a process of preparation. A commercially available product is Neosugar® (Beghin-Say, France).

Branched oligofructoses can also be used as functional ingredients in the present invention, they consist of a main chain and at least one side chain and comprise mainly fructose units. The main chain contains from 2 to 15 units and all the branching points are on fructose units. The side chains can be branched also, resulting in additional side chains. WO 91/13076, incorporated herein by reference, in the name of Raffinerie Tirlemontoise, Belgium, describes the production of branched oligosaccharides which can be used according to the invention.

The process described in WO 91/13076 can equally be used to produce branched inulin which can equally be used as a functional ingredient in the present invention.

From another point of view, the present invention relates to functional food comprising the products used for their beneficial effects in the prevention of mammary carcinogenesis and the treatment of breast cancer as indicated herein above.

A functional food is any food product considered to be edible and comprising one or more food ingredients of which it is known that they provide the consumer with a physiological benefit including for example the prevention of disease, the treatment of disease, the activation of the biorhythm or the immune system.

Normally food has two purposes: feeding and sensorial pleasure. Functional food combines this with a supplementary physiological benefit. Functional food is not a pharmaceutical product and is different from a food product which naturally comprises a food ingredient known to have a physiological benefit. Functional food shall be designed such that when applied in a normal diet, the benefit on health and disease is obtained. Therefore the food ingredient with physiological benefit, defined herein as functional ingredient, is added in an amount which is significant from a preventive or therapeutic point of view.

Depending on the type of functional food, the functional ingredient is added depending on factors such as daily intake, food law regulations, organoleptic appreciations, sensorial pleasure, dose-related side effects, such as diarrhea etc. It will be evident for the man in the art to design and produce proper functional foods once he is aware of the functional ingredient properties of a food ingredient. The purpose of the functional food being such that this food product combines physiological benefit with good feeding and organoleptic pleasure.

Functional food thus conveniently allows to acquire the necessary and beneficial amounts of a functional ingredient without the need to take pills or syrups comprising the said ingredient.

Compared to food products naturally comprising one or another beneficial food ingredient, a functional food allows the consumer to obtain a higher concentration without the need to recur to an imbalanced daily diet which would occur when significant amounts are to be taken in. As only frequent intake can ensure that a functional ingredient exercises his effect of preventing or treating disease, the consumer can decide whether to take the same functional food regularly or to diversify his diet, depending on the consumer or patients feeding mode and wishes.

Functional food looks like everyday beverages, bakery, prepared meals, confectionary, dairy, dressings, spreads. etc. but comprises a functional ingredient. The functional ingredient can either be added as a supplement or added to replace one or several of the normal ingredients.

Functional feed is administered to non-human mammals.

As a well known example of a familiar dietary component with functional ingredient properties one can cite calcium which can be added to everyday dairy products for example although they naturally comprise calcium. Calcium rich functional food can claim a beneficial effect on the prevent of osteoporosis.

Other familiar food ingredients with functional ingredient properties are certain dietary fibres reducing the risk of colon cancer for example, or oligosaccharides lowering serum triglyceride levels in hyperglycemic conditions or improving the gut flora, or gut bacteria activating the immune system.

Inulin, oligofructose and their derivatives according to the invention are food ingredients which behave as dietary fibre in that first they are not digested in the small intestine as no human digestive enzyme exists that can break down the beta($2 \rightarrow 1$)-linkages, secondly because they enhance the passage through the gut. It is known that inulin as well as oligofructose are prebiotics. In other words that they are food ingredients known to modify the composition of endogenous gut microflora (N. Delzenne et al., Lebensm-Wiss u. Technol. 27, (1994), p 1) and especially stimulate the gut Bifidobacteria. They have reduced caloric value, can modify lipid metabolism (N. Delzenne et al., Am J. Clin. Nutr. 57 (suppl), (1993), p 820S) and increase absorption of minerals such as Ca, Mg, Fe, Zn, and Cu.

The present invention exploits a thus far unknown beneficial physiological effect of inulin, oligofructose and their derivatives combined with the advantage of dealing with readily, safe and non toxic known food ingredients.

The functional ingredients according to the invention may be incorporated into food, feed or pharmaceutical products when it is in powder, liquid or cream form, according to processes readily known by the man in the art.

As an example WO 93/06744 in the name of Raffinerie Tirlemontoise, Belgium, enclosed herein by reference, describes a Rafticreaming process that can be used to prepare functional food products comprising inulin. The same process can be used to prepare creamy or inulin cream comprising OTC or pharmaceutical compositions.

Both the preferred products, Raftiline and Raftilose, are commercially available in powder form and can therefore be added to for example powdered food or tables.

The OTC or pharmaceutical compositions suited for oral administration are the ones known for such form of administration, for example, tables, (coated or non coated), pills, capsules, solutions or syrups.

By way of exception it can be conceived to administer the products according to the invention rectally. Then, the prepared composition is presented in the form of suppositories.

The pharmaceutical compositions are prepared according to the methods generally applied by pharmacists and may include solid or liquid, non-toxic and pharmaceutically acceptable vehicles. The inclusion in galenic mediums can be equally be forseen.

The percentage of active product according to the invention can vary within very large ranges, only limited by the tolerance and the level of acquaintance of the patient to the product. The limits are particularly determined by the frequency of administration.

The criteria of tolerance establishing the limits are comparable with those for functional food or feed.

The present invention is illustrated by the following examples, without limiting it.

Rat mammary carcinogenesis as used in the examples is a well established model, closely mimicking the human disease, and allows to verify whether breast carcinogenesis can be manipulated by treatment of the host.

Especially the induction of breast cancer in Sprague Dawley rats by the target specific N-methylnitrosourea (MNU) carcinogen induces tumors with a latency period between 8 and 21 weeks and with an almost 100% final breast cancer incidence in untreated rats.

MNU can be given in a single 25 to 50 mg/kg body weight dose through subcutaneous injection. The susceptibility of the mammary gland to this specific carcinogen is age-related and should therefore be used for initiation between the age of 45 to 60 days of age. That is the age of sexual maturity. The Sprague Dawley rats used are known to be particularly susceptible for these testings.

As it is known that high-fat conditions increase breast carcinogenesis, the diets fed to the rats must supply sufficient fat for normal development but without excess.

Calorie consumption is another factor influencing breast tumor incidence. Therefore the diet fed to the control group should be iso-caloric compared to the one fed to the test group and equal amounts should be consumed by both the control and the test animals.

EXAMPLE 1

Negative Modulation of Mammary Carcinogenesis 1.1 tumor induction method

30 Sprague Dawley female rats, 45 days old and weighing $+/-100$ g, are randomly divided into 4 groups. The animals of groups A and B (9 per group) receive a subcutaneous injection of 0,9% NaCl containing 50 mg/kg body weight N-methylnitrosourea (Serva, 30802) (MNU). The animals of groups C and D (6 per group) which are considered as controls are injected with the same volume of 0,9% NaCl solution. One week later, the powder diet AO3-UAR (INRA, France) of the animals of groups B and D is supplemented with 5% w/w Raftilose P95 (Raffinerie Tirlemontoise, Belgium) (OF). The concentration of OF in the diet is increased to 10% the second week and is finally 15% after the third week and until the end of the experiment. The animals of groups A and C receive successively the powder diet containing a supplement of 1%, 2,5% and 5% starch. This is an isocaloric diet as compared to the OF supplemented diet. Food and water are available at libitum.

Parameters monitored weekly are: body weight gain, diet and water consumption, fecal excretion. The size, number and position of putative mammary tumors are assessed by palpation.

At week 27, rats are anesthesised with diethylether and killed by exsanguination. The organs (liver, kidneys, lungs, mammary glands) are macroscopically examined in situ and then weighed. The tumors are described (localisation, aspects) and measured. Tissue samples are taken and fixed in formalin for 3 weeks, then embedded in paraffine for further hematoxylin-eosin coloration and histological examination.

1.2. Results during the experiment

The diet consumption was not significantly different between the different groups. The dry weight of fecal excretion was not significantly different in OF treated rats as compared to rats receiving starch.

Figure 5:
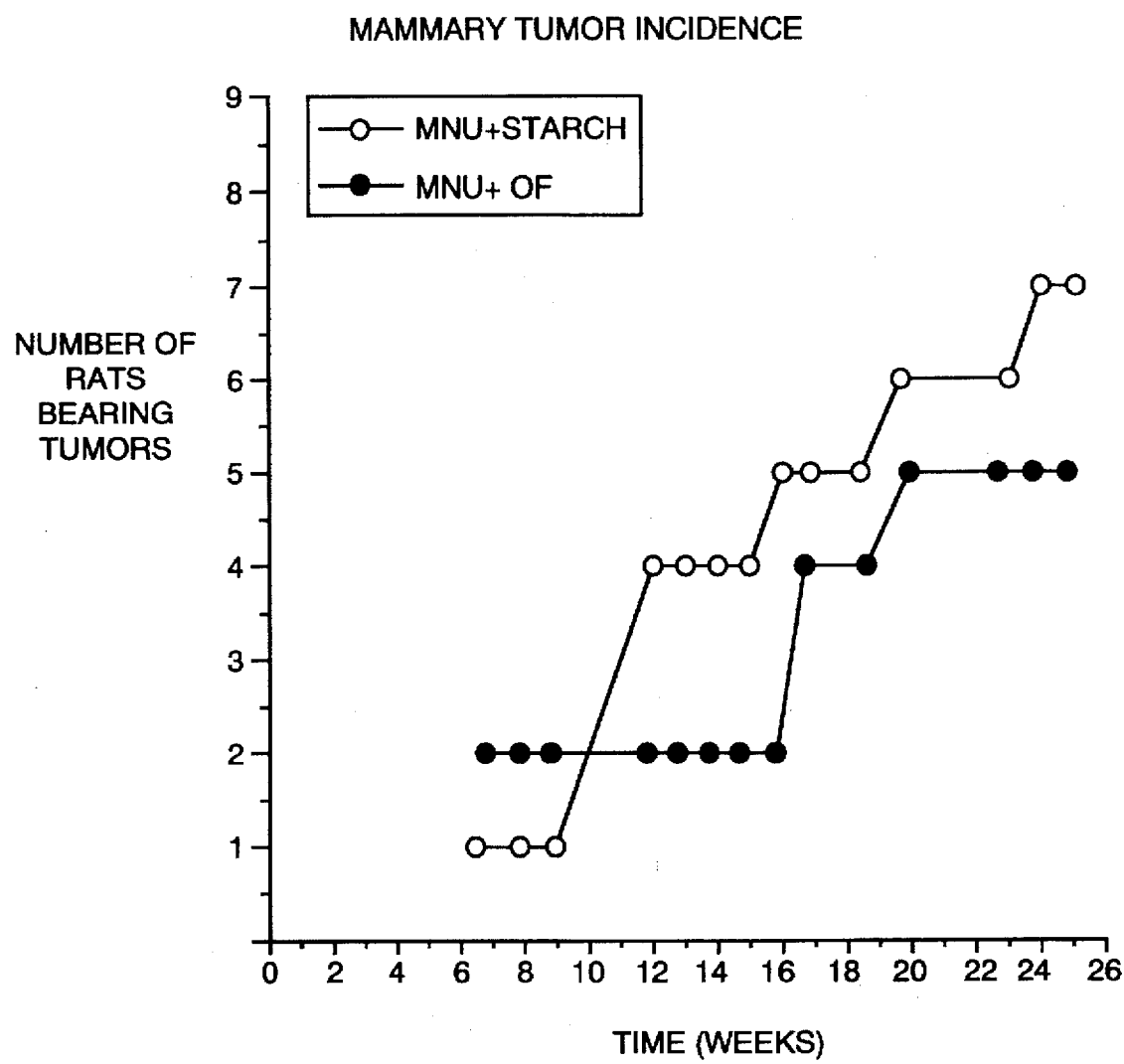
FIG. 5 illustrates the tumor incidence (number of rats bearing mammary tumors in one group) according to Example 1.1.
Figure 6:
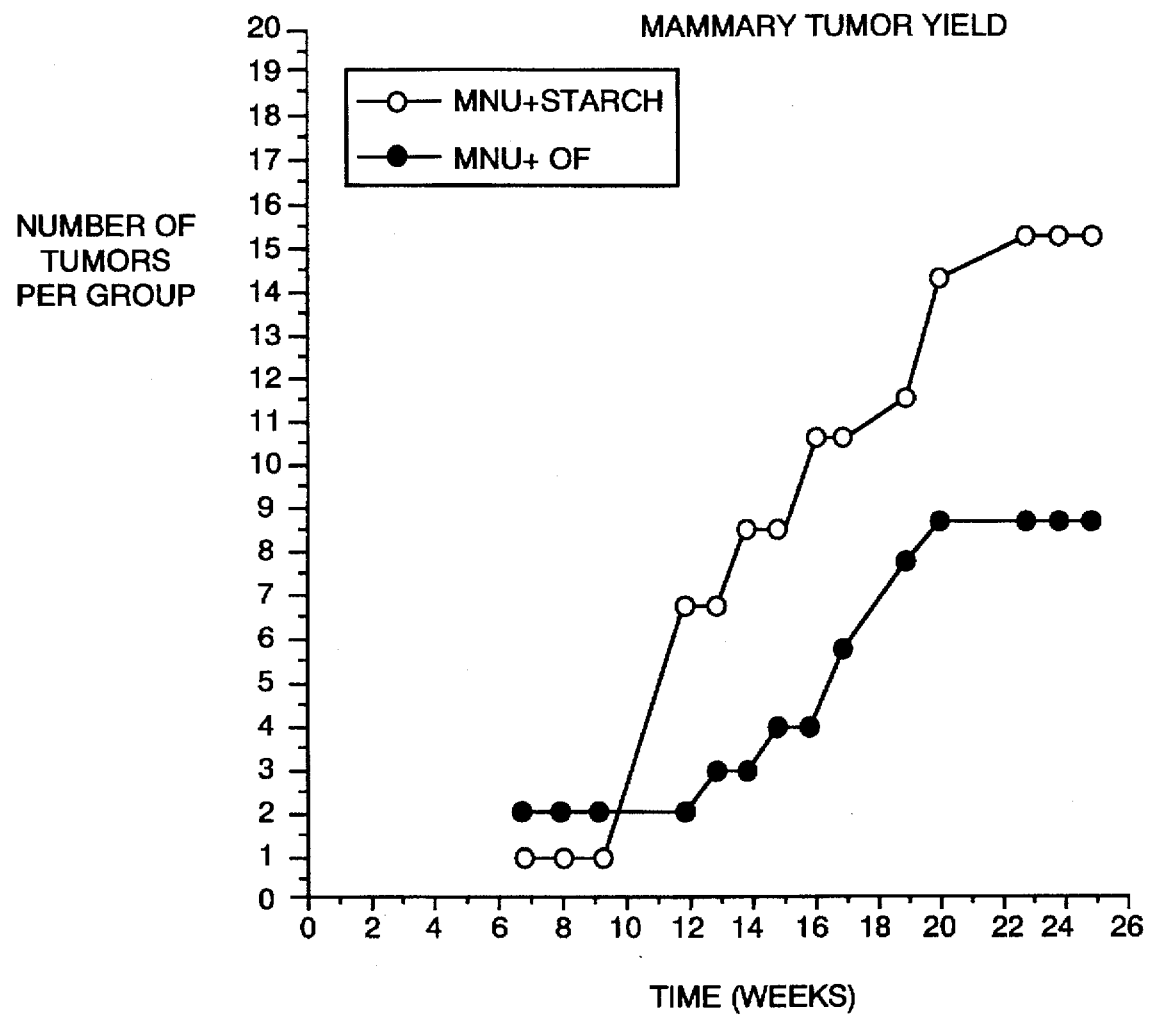
FIG. 6 illustrates the yield or total number of malignant tumors in one group according to Example 1.1.

During the experiment according to example 1.1, the size, number and position of the tumors were evaluated using palpation and recorded as represented in FIGS. 5 and 6; they give the tumor incidence (the number of rats bearing mammary tumors in one group) and the yield (total number of malignant tumors in one group). It can be seen from these data that the incidence and yield of mammary tumors is always lower in rats fed OF instead of starch.

1.3. Results at the end of the experiment

After the sacrifice at week 27, the tumors are macroscopically analysed and all the organs are checked for the putative presence of lesions. Histological examination allows to classify the tumors as benign or malignant. The incidence of metastases and tumors in other organs or tissues is noted. As shown in table 1, in the control group A, where 7 out of 9 rats are bearing tumors: 19 malignant mammary cancers, consisting mainly of low or mid-differentiated adenocarcinoma and 2 renal fibrosarcoma. One of those rats has an epidermal, cystic papilloma of salivary glands with no signs of malignity. The examination of the organs after sacrificing the animals revealed that the number of rats bearing cancer, the incidence, was the same for group B (MNU/OF), 7 out of 9 are bearing tumors. But the total number, or yield, of low or mid-differentiated adenocarcinoma is lower in group B than in group A: only 12 mammary adenocarcinoma are diagnosed, but neither renal tumors nor metastasis can be detected. The total volume of mammary tumors is almost 50% higher in the control group. The mean volume of mammary tumors is more or less the same in both groups, but lower in OF fed animals. The mean number of malignant mammary tumors per rat bearing cancer, the tumor intensity, at the time of sacrifice was lower in group B (MNU/OF) namely 1,7 compared to almost a double intensity in the control group A (MNU/starch), namely 3.

TABLE 1

| Rats | Tumor | | | | | | Volume (cm³) | |
|---|---|---|---|---|---|---|---|---|
| | | Malignant | | | | | | |
| | Be-nign | Mammary adenocarcinoma | other | yield | intensity | Metastasis | of mammary tumors Total | Mean |
| Control-fed | 1 | 19 | 2 | 21 | 3 | 2 | 132 | 6,9 |
| OF fed | 0 | 12 | 0 | 12 | 1,7 | 0 | 73 | 6,1 |

From the above it can be concluded that addition of oligofructose to the diet negatively modulates mammary carcinogenesis by slowing down the kinetics of appearance of breast tumors. Although the incidence looks the same, the mammary tumor intensity is lower.

EXAMPLE 2

Negative Modulation with Oligofructose, Inulin and Pectin 2.1. tumor induction method 45 days old female Sprague Dawley rats weight +/−100 g are purchased from Charles River, Germany. They are housed by 3 in suspended stainless steel cages under temperature and humidity control with a 12/12 h light/dark cycle. Food and water are available at libitum. After their arrival, the rats are adapted to new housing conditions during 1 week. At the age of 52 days the rats are initiated for mammary carcinogenesis by a single subcutaneous injection of 50 mg/kg body weight MNU (Serva, 3080 2) in 0,9% NaCl. 3 days after initiation, a period necessary to recover from MNU toxicity, the rats of the ad hoc experimental groups are given access to a semi-synthetic DIET (INRA, France) comprising 65% maize starch, 5% cellulose, 3% maize oil, 3% palmoil (not hydrogenated), 22% pure casein, 1,2% vitamines, 0,8% minerals and 0,13% methionin supplemented with 5% OF, inulin (Raftiline®) or pectin for 5 days. The next five days a supplement of 10% of the same non digestible oligosaccharides or dietary fibre is given. Finally, until the end of the experiment, they will receive experimental diets supplemented with 15% OF, inulin or pectin.

Parameters examined during the test are: body weight starting from the adaptation period, palpation, measurement and description of the mammary tumors once every 2 weeks, starting 6 weeks after MNU injection, diet and water consumption and 24 h faecal excretion once every 6 weeks starting 6 weeks after MNU injection.

After sacrificing the animals the following parameters are determined: mammary tumor incidence, mammary tumor intensity and yield, mammary tumor diameters, determination of types of mammary tumors (benign or malignant), metastases incidence, incidence of tumors in other organs and tissues. Statistical analysis of the results are done according to relevant procedure.

EXAMPLE 3

Effect of Oligofructose on Initiation of Breast Carcinogenesis

The experimental protocol according to example 1.1 and 2.1 illustrates the protective effects of inulin and oligofructose on the promotion (phase II) and progression (phase III) of breast carcinogenesis.

In order to investigate the effect of oligofructose and inulin on all phases of breast carcinogenesis, including phase I of initiation, the following protocol is followed.

Sprague Dawley rats of 37 days of age are given a semi-synthetic diet (INRA, France) supplemented with 5% OF for 5 days, followed by 5 days of a 10% supplemented and subsequently 15% supplemented diet. Only then the rats are initiated with MNU at a dose of 50 mg/kg body weight in 0,9% NaCl and fed the 15% supplemented diet until the end of the experiment. The same parameters are being controlled as in example 2.1.

We claim:

1. Method of preventing mammary carcinogenesis in a mammal susceptible to mammary carcinogenesis which comprises the administration to said mammal of a sufficient amount of a composition comprising at least one physiologically active ingredient selected from the group consisting of inulin, oligofructose and mixtures thereof.

2. Method according to claim 1, wherein the said physiologically active ingredient has a negatively modulating effect on mammary carcinogenesis.

3. Method according to claim 2, wherein said physiologically active ingredient has one or more of the following effects: slows down the kinetic appearance of malignant breast tumors, lowers the incidence of breast cancer, lowers the intensity of breast cancer, lowers the yield of tumors, lowers the degree of malignancy of the breast cancer, lowers the degree of invasiveness of malignant breast cancer, reduces metastasis of breast cancer.

4. Method according to claim 1, wherein said inulin comprises native chicory inulin.

5. Method according to claim 1, wherein said oligofructose is obtained by enzymatic hydrolysis of native inulin from chicory, J. artichoke or dahlia.

6. Method according to claim 1, wherein the composition further comprises an ingredient that actively destroys malignant breast tumor cells.

7. Treatment method of breast cancer in a mammal, which comprises the administration to said mammal of a sufficient amount of a composition comprising at least one physiologically active ingredient selected among the group consisting of inulin, oligofructose and mixtures thereof.

8. Method according to claim 7, wherein the said physiologically active ingredient has a negatively modulating effect on mammary carcinogenesis.

9. Method according to claim 7, wherein said physiologically active ingredient has one or more of the following effects: slows down the kinetic appearance of malignant breast tumors, lowers the incidence of breast cancer, lowers the intensity of breast cancer, lowers the yield of tumors, lowers the degree of malignancy of the breast cancer, lowers the degree of invasiveness of malignant breast cancer, reduces metastasis of breast cancer.

10. Method according to claim 7, wherein said inulin comprises native chicory inulin.

11. Method according to claim 7, wherein said oligofructose is obtained by enzymatic hydrolysis of native inulin from chicory, J. artichoke or dahlia.

12. Method according to claim 7, wherein the composition further comprises an ingredient that actively destroys malignant breast tumor cells.

13. Method according to claim 7, wherein said physiologically active ingredient is administered in a pharmaceutically acceptable carrier or in a food or feed.

14. Method according to claim 7, wherein said physiologically active ingredient is administered in a pharmaceutically acceptable carrier on in a food or feed.

15. Composition for the prevention of mammary carcinogenesis or treatment of breast cancer which comprises at least one physiologically active ingredient selected from the group consisting of inulin, oligofructose and mixtures thereof, which further comprises chemotherapeutic products capable of actively destroying malignant breast tumor cells.

* * * * *

UNITED STATES PATENT AND TRADEMARK OFFICE
CERTIFICATE OF CORRECTION

PATENT NO. : 5,721,345
DATED : February 24, 1998
INVENTOR(S) : Marcel Roberfroid, Nathalie Delzenne, Paul Coussement & Jan Van Loo It is certified that error appears in the above-identified patent and that said Letters Patent is hereby corrected as shown below:

Claim 14, Col. 14, line 11, "on" should be --or--.

Signed and Sealed this

Fifteenth Day of September, 1998

Attest:

BRUCE LEHMAN

Attesting Officer

Commissioner of Patents and Trademarks